US012591383B1

(12) United States Patent
Kang et al.

(10) Patent No.: US 12,591,383 B1
(45) Date of Patent: Mar. 31, 2026

(54) ALLOCATING USABLE CAPACITY FROM DATA STORAGE DRIVES HAVING DIFFERENT CAPACITIES

(71) Applicant: Dell Products L.P., Round Rock, TX (US)

(72) Inventors: Jianbin Kang, Beijing (CN); Vamsi K. Vankamamidi, Hopkinton, MA (US); Geng Han, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/965,231

(22) Filed: Dec. 2, 2024

(51) Int. Cl.
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0631; G06F 3/0604; G06F 3/0689
See application file for complete search history.

(56) References Cited

U.S. PATENT DOCUMENTS

| | | | |
|---|---|---|---|
| 6,311,251 B1 * | 10/2001 | Merritt .................. | G06F 3/0689 |
| | | | 711/114 |
| 9,495,112 B1 | 11/2016 | Braun et al. | |
| 9,875,052 B2 | 1/2018 | Agombar et al. | |
| 10,261,712 B2 | 4/2019 | Agombar et al. | |
| 10,592,111 B1 * | 3/2020 | Wang ..................... | G06F 3/0619 |
| 10,949,098 B2 | 3/2021 | Levinson et al. | |
| 2019/0235781 A1 * | 8/2019 | Gong .................... | G06F 3/0665 |
| 2020/0117386 A1 * | 4/2020 | Dong .................... | G06F 3/0608 |

* cited by examiner

*Primary Examiner* — Kevin Verbrugge
(74) *Attorney, Agent, or Firm* — BainwoodHuang

(57) ABSTRACT

Virtual RAID groups are allocated based on a set of data storage drives that are ordered in descending order of available capacity. To allocate each virtual RAID group, beginning with a second ordered data storage drive in the ordered set of data storage drives, i) individual storage slices are allocated from subsequent data storage drives in the ordered set of data storage drives until a total number of required storage slices has been allocated to the virtual RAID group, ii) available capacities of the data storage drives are updated to reflect the unavailability of storage slices allocated to the virtual RAID group, and iii) the set of data storage drives is re-ordered in descending order of available capacity, based on the updated available capacities of the data storage drives.

15 Claims, 6 Drawing Sheets

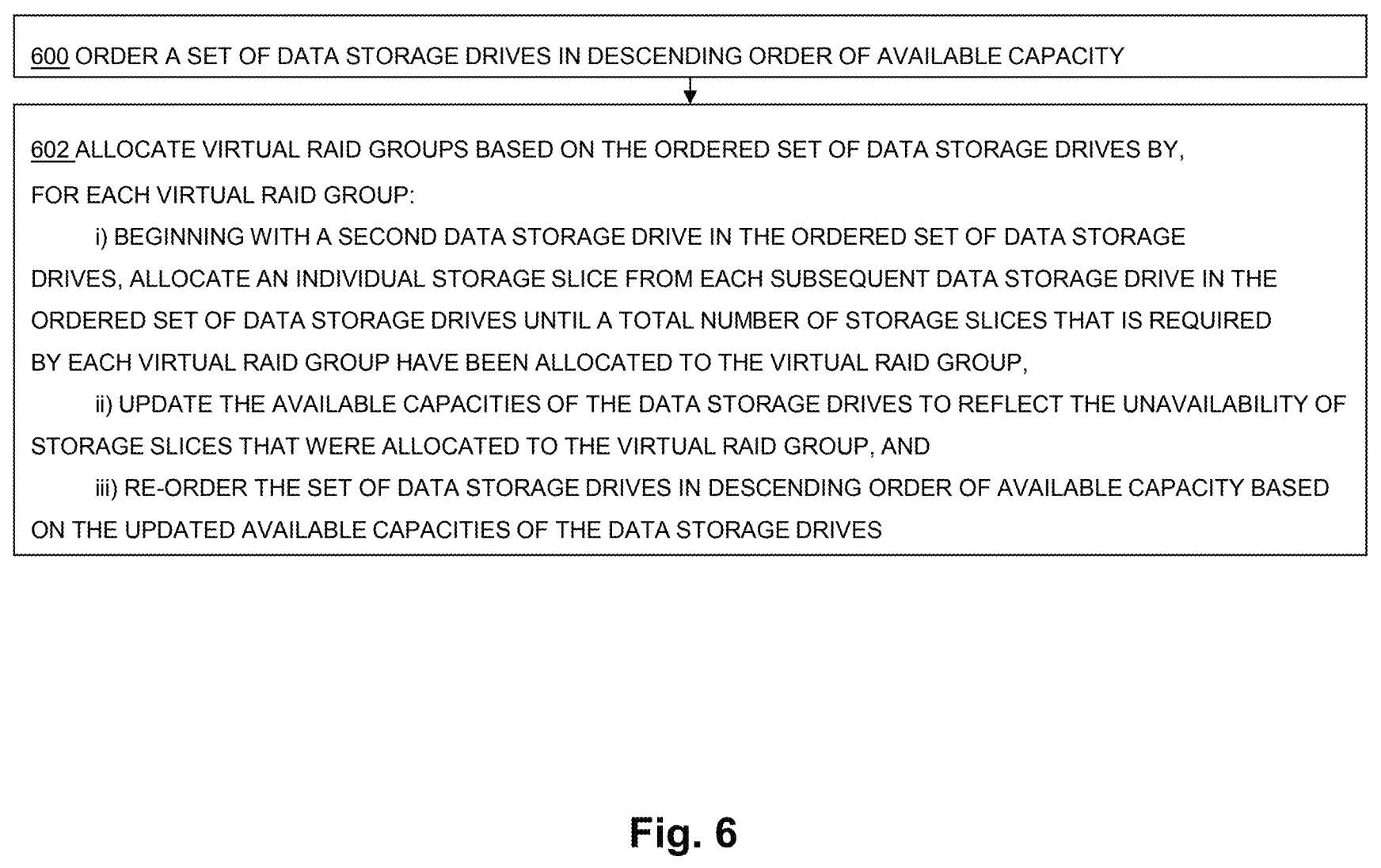

600 ORDER A SET OF DATA STORAGE DRIVES IN DESCENDING ORDER OF AVAILABLE CAPACITY

602 ALLOCATE VIRTUAL RAID GROUPS BASED ON THE ORDERED SET OF DATA STORAGE DRIVES BY,

FOR EACH VIRTUAL RAID GROUP:

i) BEGINNING WITH A SECOND DATA STORAGE DRIVE IN THE ORDERED SET OF DATA STORAGE DRIVES, ALLOCATE AN INDIVIDUAL STORAGE SLICE FROM EACH SUBSEQUENT DATA STORAGE DRIVE IN THE ORDERED SET OF DATA STORAGE DRIVES UNTIL A TOTAL NUMBER OF STORAGE SLICES THAT IS REQUIRED BY EACH VIRTUAL RAID GROUP HAVE BEEN ALLOCATED TO THE VIRTUAL RAID GROUP, ii) UPDATE THE AVAILABLE CAPACITIES OF THE DATA STORAGE DRIVES TO REFLECT THE UNAVAILABILITY OF STORAGE SLICES THAT WERE ALLOCATED TO THE VIRTUAL RAID GROUP, AND iii) RE-ORDER THE SET OF DATA STORAGE DRIVES IN DESCENDING ORDER OF AVAILABLE CAPACITY BASED ON THE UPDATED AVAILABLE CAPACITIES OF THE DATA STORAGE DRIVES

Fig. 6

ALLOCATING USABLE CAPACITY FROM DATA STORAGE DRIVES HAVING DIFFERENT CAPACITIES

TECHNICAL FIELD

This disclosure relates generally to allocating usable capacity from data storage drives, and more specifically to allocating usable capacity from data storage drives having different capacities in a data storage system.

BACKGROUND

Data storage systems include one or more physical or virtual data storage nodes that are made up of hardware and/or software, and that service host I/O requests received from physical and/or virtual host machines ("hosts"). Host I/O requests received by a node specify user data that is written and/or read by the hosts. The storage node executes software that processes the host I/O requests by performing various data processing tasks to organize and persistently store the user data in non-volatile data storage.

SUMMARY

In the disclosed technology, a set of data storage drives is ordered in descending order of available capacity. Multiple virtual RAID groups are then allocated based on the ordered set of data storage drives by, for each one of the virtual RAID groups that is allocated, beginning with a second data storage drive in the ordered set of data storage drives, i) allocating an individual storage slice from each subsequent data storage drive in the ordered set of data storage drives until a total number of storage slices that is required by each virtual RAID group has been allocated to the virtual RAID group, ii) updating the available capacities of the data storage drives to reflect the unavailability of storage slices that were allocated to the virtual RAID group, and iii) re-ordering the set of data storage drives in descending order of available capacity based on the updated available capacities of the data storage drives.

In some embodiments, a first data storage drive in the ordered set of data storage drives is reserved such that storage slices are not allocated from the first data storage drive. When no further virtual RAID groups can be allocated, allocated storage slices located in data storage drives other than the first data storage drive are swapped with available storage slices located in the first data storage drive in order to proportionately distribute spare storage capacity within the set of data storage drives across all the data storage drives in the set of data storage drives.

In some embodiments, when allocating a virtual RAID group, a storage drive from which a last slice is to be allocated to the virtual RAID group is selected from within multiple storage drives having the same available capacity by selecting a storage drive from which the fewest number of slices have previously been allocated to previously allocated virtual RAID groups that also contain storage slices located on storage drives from which slices have previously been allocated to the virtual RAID group currently being allocated.

In some embodiments, RAID stripes for storing host data are allocated from individual virtual RAID groups.

In some embodiments, the total number of storage slices required by each virtual RAID group is equal to the RAID width of the RAID stripes allocated from the individual virtual RAID groups.

The disclosed technology is integral to a technical solution to the problem of utilizing the data storage capacity in "hybrid" arrays of data storage drives, in which different individual ones of the data storage drives have different data storage capacities. Without the disclosed technology, significant portions of one or more of the data storage drives in a hybrid array may be left unused. As a result, without the disclosed technology, significant amounts of the total storage drive capacity in the hybrid array may be wasted.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 6 is a flow chart showing an example of steps performed during operation of some embodiments of the disclosed technology.

DETAILED DESCRIPTION

Figure 1:
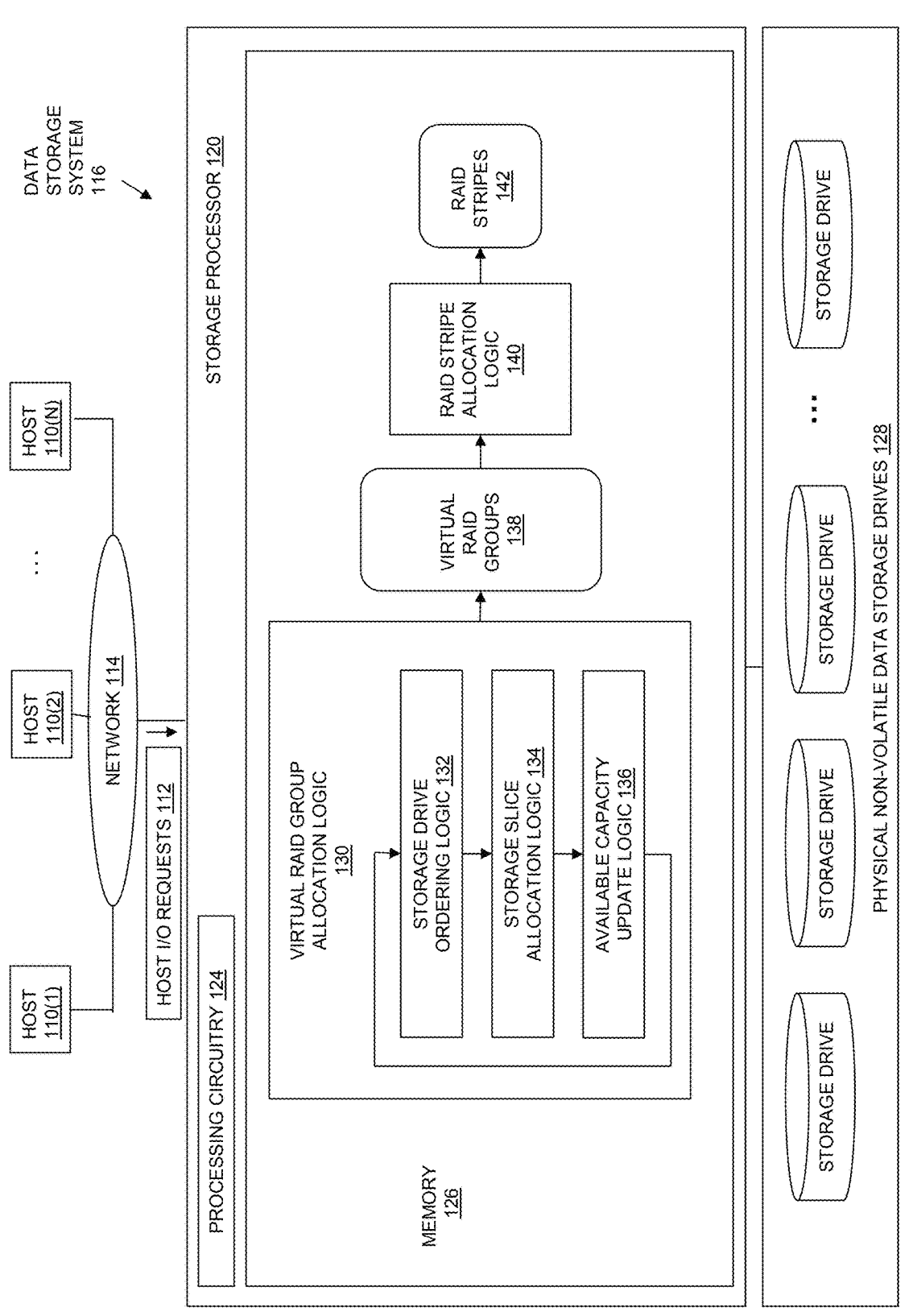
FIG. 1 is a block diagram showing an example of the disclosed technology in some embodiments.

Embodiments will now be described with reference to the figures. The embodiments described herein are provided only as examples, in order to illustrate various features and principles of the disclosed technology and are not limiting. The embodiments of the disclosed technology described herein are integrated into a practical solution for utilizing data storage capacity in hybrid arrays of data storage drives.

Embodiments of the disclosed technology provide RAID (Redundant Array of Independent Disks) data storage virtualization/protection technology. The disclosed technology combines storage slices that are allocated from different physical data storage drives to allocate individual virtual RAID groups. RAID stripes are allocated from individual virtual RAID groups. RAID stripes allocated from a virtual RAID group store received host data by striping the host data across the storage slices allocated to that virtual RAID group. Different RAID levels may be used, depending on required levels of redundancy and performance. Specifically, storing received host data into a RAID stripe involves segmenting the received host data into logically sequential blocks (e.g. sequential blocks in an address space of a logical storage object served by the data storage system), and storing data written to consecutive blocks in the logical sequence of blocks onto the different ones of the storage slices in the virtual RAID group, thereby storing consecutive blocks of host data onto different data storage drives. By spreading the host data across multiple, different data storage drives that can be accessed concurrently, total data throughput may be increased.

RAID levels that employ "parity" error protection may be used to provide fault tolerance by maintaining one or more additional parity blocks in each RAID stripe. For example, a parity block for a RAID stripe may be maintained that is the result of performing a bitwise exclusive "OR" (XOR) operation across the data blocks in the stripe. When physical storage for a data block in the RAID stripe fails, e.g. due to a data storage drive failure, the lost data block can be recovered by performing an XOR operation across the remaining data blocks and the parity block.

For example, some embodiments of the disclosed technology use a RAID level that uses block level striping with distributed parity error protection known as 4D+1P ("four data plus one parity") RAID-5. In 4D+1P RAID-5, each stripe consists of 4 data blocks and one block of parity information. In a virtual RAID group from which 4D+1P RAID-5 stripes are allocated, five storage slices from five different storage drives are combined to store the data and parity information, so that each one of the four data blocks and the parity information for each RAID stripe is stored on a different storage drive. The RAID width of 4D+1P RAID-5 is equal to 5, indicating that a virtual RAID group supporting 4D+1P RAID-5 level RAID stripes must include 5 storage slices allocated from 5 different storage drives. 4D+1P RAID-5 is generally considered to be effective in preventing data loss in the case of single storage drive failures.

Spare storage space may also be reserved to handle storage drive failures. In the event one of the storage drives fails, the data stored on the failed storage drive can be rebuilt onto the spare storage space by performing XOR operations on the remaining data blocks and the parity information on a per-stripe basis.

In another example, some embodiments of the disclosed technology may use RAID levels that provide data protection even in the event that multiple storage drives fail concurrently. For example, 4D+2P RAID-6 provides striping with double distributed parity information that is stored on a per-stripe basis. The RAID width of 4D+2P RAID-6 is accordingly equal to 6, indicating that a virtual RAID group supporting allocation of 4D+2P RAID-6 level RAID stripes must include 6 storage slices that are allocated from 6 different storage drives. The double parity information maintained by 4D+2P RAID-6 enables data protection for up to a maximum of two concurrently failing drives.

As described further herein, the disclosed technology orders a set of data storage drives in descending order of available capacity. Individual virtual RAID groups are then allocated based on the ordered set of data storage drives, with the ordering being regenerated after allocation of each virtual RAID group. Specifically, for each one of the virtual RAID groups that is allocated, the disclosed technology operates by beginning with a second data storage drive in the ordered set of data storage drives, and performing the steps of i) allocating an individual storage slice from each subsequent data storage drive in the ordered set of data storage drives until a total number of required storage slices has been allocated to the virtual RAID group, ii) updating the available capacities of the data storage drives to reflect the unavailability of those storage slices that were allocated to the virtual RAID group, and iii) re-ordering the set of data storage drives, again in descending order of available capacity, based on the updated available capacities of the data storage drives.

A first data storage drive in the ordered set of data storage drives may be reserved as spare storage capacity, such that no storage slices are allocated from it while the virtual RAID groups are being allocated. When no further virtual RAID groups can be allocated, storage slices allocated to the virtual RAID groups and initially located on data storage drives other than the first data storage drive are swapped with available storage slices located on the first data storage drive, until the spare storage capacity is distributed proportionately across all the data storage drives in the set of data storage drives, in order to provide a higher level of parallelism during recovery after a storage drive failure.

During allocation of a virtual RAID group, a storage drive from which a last slice is to be allocated to the virtual RAID group may be selected from within multiple storage drives that all have the same available capacity by selecting the storage drive from which the fewest number of slices have previously been allocated to previously allocated virtual RAID groups that also contain storage slices located on storage drives from which slices have previously been allocated to the virtual RAID group currently being allocated.

RAID stripes for storing host data are allocated from individual virtual RAID groups, and the total number of storage slices required by each virtual RAID group is equal to the RAID width of the RAID level of the RAID stripes that are allocated.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. though one or more communication interfaces. No particular hardware configuration is required, and Storage Processor 120 may be embodied as any specific type of device that is capable of processing host input/output (I/O) requests (e.g. I/O read requests and I/O write requests, etc.) and persistently storing host data.

Physical Non-Volatile Data Storage Drives 128 includes physical data storage drives such as solid-state drives, magnetic disk drives, hybrid drives, optical drives, and/or other specific types of drives.

Memory 126 stores program code that is executed on Processing Circuitry 124, as well as data generated and/or processed by such program code. Memory 126 may include volatile memory (e.g. RAM), and/or other types of memory.

Processing Circuitry 124 includes or consists of multiple processor cores, e.g. within one or more multi-core processor packages. Each processor core includes or consists of a separate processing unit, sometimes referred to as a Central Processing Unit (CPU), and is capable of independently executing instructions.

Processing Circuitry 124 and Memory 126 together form control circuitry that is configured and arranged to carry out various methods and functions described herein. Memory 126 stores a variety of software components that may be provided in the form of executable program code. For example, Memory 126 may include software components such as Virtual RAID Group Allocation Logic and RAID Stripe Generation Logic 140. When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

Data Storage System 116 provides one or more data storage services to Hosts 110. Host I/O Requests 112 include host I/O write requests that indicate host data that is to be stored by Data Storage System 116 in Physical Non-Volatile Data Storage Drives 128. Examples of data storage protocols that may be supported by Data Storage System 116 include without limitation Fibre Channel (FC), Internet Small Computer Systems Interface (iSCSI), and/or Non-Volatile Memory Express (NVMe) protocols.

During operation of the components shown in FIG. 1, Virtual RAID Group Allocation Logic 130 allocates Virtual RAID Groups 138 from Physical Non-Volatile Data Storage Drives 128. RAID Stripe Allocation Logic 140 then allocates RAID Stripes 142 from Virtual RAID Groups 138. RAID Stripes 142 are used to store host data received by Data Storage System 116.

For example, Storage Drive Ordering Logic 132 initially orders a set of data storage drives contained in Physical Non-Volatile Data Storage Drives 128 in descending order of their individual available capacities. For example, the initial ordering of the set of data storage drives may be based on available capacities of the individual data storage drives that are the total capacities of the individual data storage drives. Storage Slice Allocation Logic 134 then begins with a second data storage drive in the ordered set of data storage drives and allocates an individual storage slice from each subsequent data storage drive in the ordered set of data storage drives until the total number of required storage slices has been allocated to the virtual RAID group. Each data storage drive is divided into fixed sized storage slices, e.g. each storage slice consisting of four gigabytes of physically contiguous data storage. The total number of storage slices required by each virtual RAID group in Virtual RAID Groups 138 is equal to the RAID width of the RAID level of the RAID Stripes 142. In the case where RAID Stripes 142 are 4D+1P RAID-5, the RAID width is 5.

After Storage Slice Allocation Logic 134 has allocated the total number of required data storage slices to the virtual RAID group, Available Capacity Update Logic 136 updates the available capacities of the data storage drives in the set of data storage drives to reflect the unavailability of those storage slices that were allocated to the virtual RAID group. For example, Available Capacity Update Logic 136 subtracts the size of one storage slice from the available capacity of each one of the data storage drives from which a storage slice was allocated to the virtual RAID group in order to generate an updated available capacity for that data storage drive.

After Available Capacity Update Logic 136 has updated the available capacities of the data storage drives in the set of data storage drives to reflect the unavailability of those storage slices that were allocated to the virtual RAID group, Storage Drive Ordering Logic 132 re-orders the set of data storage drives, again in descending order of available capacity, based on the updated available capacities of the data storage drives. Storage Slice Allocation Logic 134 then allocates another virtual RAID group based on the re-ordered set of data storage drives. Available Capacity Update Logic 136 then updates the available capacities of the data storage drives again, and Storage Drive Ordering Logic 132 re-orders the set of data storage drives based on the updated available capacities of the data storage drives. This process of allocating virtual RAID groups is then repeated until the capacity of the data storage drives in the set of data storage drives has been fully allocated except for the capacity of the reserved first data storage drive in the initial ordered set of data storage drives, as further described below.

The first data storage drive in the initial ordering of the set of data storage drives is reserved as spare storage capacity, and no storage slices are allocated from that data storage drive while virtual RAID groups are allocated from the remaining data storage drives. When no further virtual RAID groups can be allocated from the data storage drives other than the reserved data storage drive that was first in the initial ordering, Virtual RAID Group Allocation Logic 130 swaps the storage slices that were allocated to virtual RAID groups in Virtual RAID Groups 138 and located on data storage drives other than the reserved first data storage drive in the initial ordering of the set of data storage drives, with available storage slices on the reserved first data storage drive in the initial ordering of the set of data storage drives, until the spare storage capacity is distributed proportionally across all the data storage drives in the set of data storage drives. By distributing the spare storage capacity of the set of data storage drives proportionally across all the data storage drives, the same proportion of the total capacity of each data storage drive consists of spare storage capacity, and a higher level of parallelism may advantageously be achieved during recovery after a storage drive failure.

In some embodiments, during the allocation of a virtual RAID group, Storage Slice Allocation Logic 134 operates by selecting, from within a group of multiple data storage drives in the set of data storage drives that all have the same available capacity, a data storage drive from which a last slice is to be allocated to the virtual RAID group. For example, the data storage drive from which the last storage slice is allocated to the virtual RAID group may be selected as the storage drive within the group from which the fewest number of storage slices have previously been allocated to previously allocated virtual RAID groups that also contain storage slices located on storage drives from which storage slices have previously been allocated to the virtual RAID group that is currently being allocated.

Figure 2:
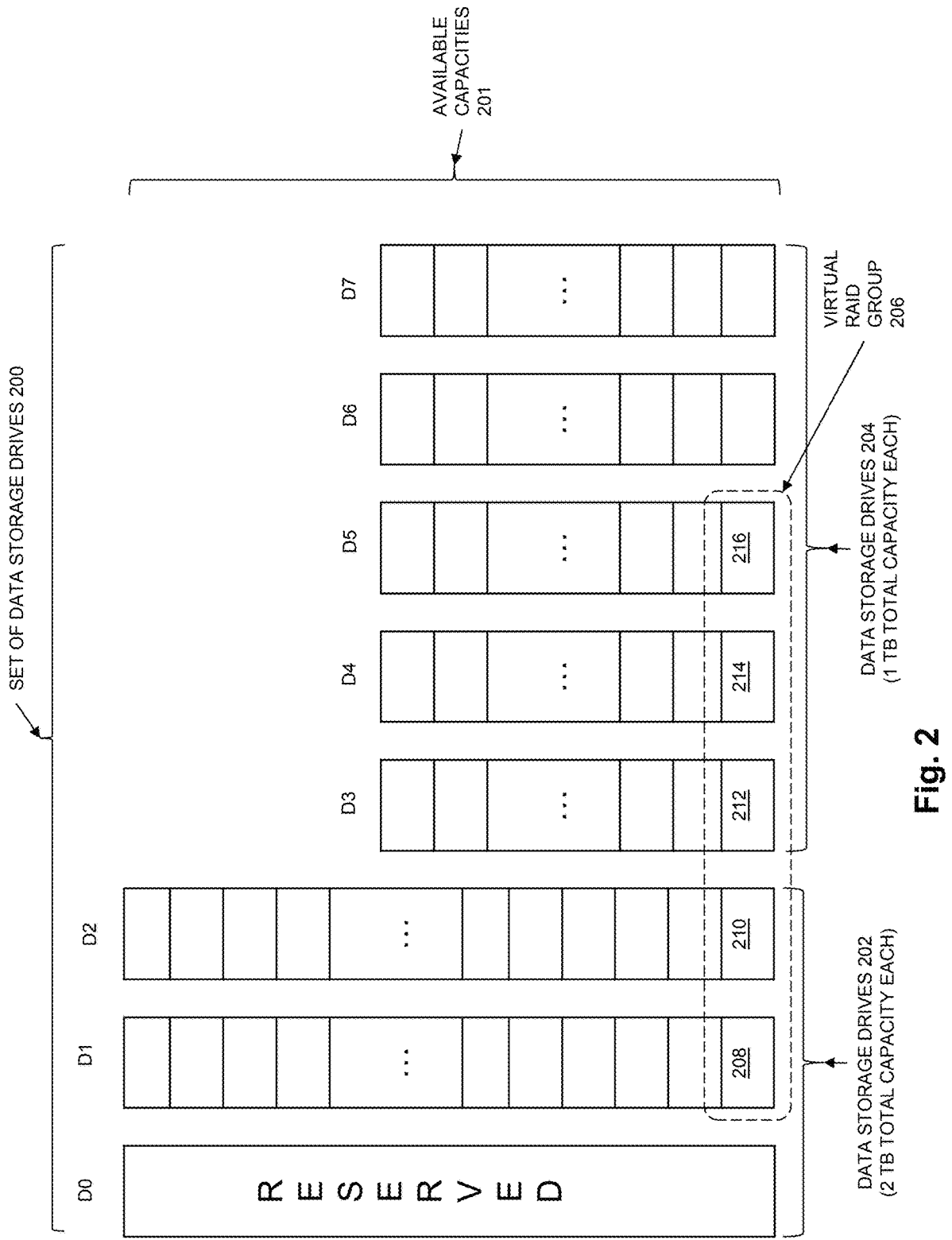
FIG. 2 is a block diagram showing an example of a set of non-volatile data storage drives, and illustrating operation of the disclosed technology while allocating an initial virtual RAID group.

FIG. 2 is a block diagram showing an example of a Set of Data Storage Drives 200. Each data storage drive is divided into fixed sized storage slices. In the example of FIG. 2, each storage slice consists of four gigabytes of physically contiguous data storage. The Set of Data Storage Drives 200 includes three data storage drives with 2 terabytes each of total capacity, shown by data storage drives D0, D1, and D2 in Data Storage Drives 202. The Set of Data Storage Drives 200 further includes five data storage drives each having 1 terabyte of total capacity, shown by data storage drives D3, D4, D5, D6, and D7 in Data Storage Drives 204. In FIG. 2, no virtual RAID groups have been allocated yet, and the Available Capacities 201 are equal to the total capacity of each data storage drive. Accordingly, the available capacity of each one of the data storage drives D0, D1, and D2 is 2 terabytes, and the available capacity of each one of the data storage drives D3, D4, D5, D6, and D7 is 1 terabyte. The data storage drives in Set of Data Storage Drives 200 have been ordered in descending order of available capacity by Storage Drive Ordering Logic 132, to generate an initial ordered set of data storage drives, shown in order from left to right as D0, D1, D2, D3, D4, D5, D6, and D7. The data storage drives in Data Storage Drives 202 each have relatively higher available capacities and are accordingly placed higher in the ordered set of data storage drives. The data storage drives in Data Storage Drives 204 each have relatively lower available capacities and are accordingly placed lower in the ordered set of data storage drives. The relative ordering of data storage drives within groups of data storage all having the same available capacity may be arbitrary. Accordingly, the relative ordering of the data storage drives in Data Storage Drives 202 may be arbitrary. Similarly, the relative ordering of the data storage drives in Data Storage Drives 204 may be arbitrary.

In the example of FIG. 2, the total number of storage slices required by each virtual RAID group is 5. Storage Slice Allocation Logic 134 allocates 5 storage slices to a first Virtual Raid Group 206 based on the initial ordered set of data storage drives, e.g. D0, D1, D2, D3, D4, D5, D6, and D7. Specifically, Storage Slice Allocation Logic 134 starts with the second data storage drive in the ordered set of data storage drives (e.g. data storage drive D1) and allocates an individual storage slice from each subsequent data storage drive in the ordered set of data storage drives until 5 storage slices have been allocated to Virtual RAID Group 206. Specifically, Storage Slice Allocation Logic 134 allocates storage slice 208 from data storage drive D1, storage slice 210 from data storage drive D2, storage slice 212 from data storage drive D3, storage slice 214 from data storage drive D4, and storage slice 216 from data storage drive D5.

FIG. 2 further illustrates how the first data storage drive D0 in the initial ordered set of data storage drives is reserved as spare storage capacity. Accordingly, no storage slices are allocated from data storage drive D0 while virtual RAID groups are being allocated from the remaining data storage drives D1, D2, D3, D4, D5, D6, and D7 until the capacity of the remaining data storage drives has been completely allocated to virtual RAID groups, at which time the spare storage capacity reserved in the data storage drive D0 is distributed proportionally across all the data storage drives in Set of Data Storage Drives 200, as further describe below with reference to FIGS. 4-5.

After Virtual RAID Group 206 is allocated, Available Capacity Update Logic 136 updates the available capacities of the data storage drives in Set of Data Storage Drives 200 to reflect the unavailability of storage slices 208, 210, 212, 214, and 216 that were allocated to Virtual RAID Group 206. For example, Available Capacity Update Logic 136 subtracts the size of one storage slice (e.g. four gigabytes) from the available capacity of data storage drives D1, D2, D3, D4, and D5, from which those storage slices were allocated to Virtual RAID Group 206. In this way, an updated available capacity is generated for each one of the data storage drives D1, D2, D3, D4, and D5.

After Available Capacity Update Logic 136 has updated the available capacities of the data storage drives in Set of Data Storage Drives 200 to reflect the unavailability of storage slices 208, 210, 212, 214, and 216 that were allocated to Virtual RAID Group 206, Storage Drive Ordering Logic 132 re-orders Set of Data Storage Drives 200, again in descending order of available capacity, based on the updated available capacities. The resulting updated ordering of D0, D1, D2, D6, D7, D3, D4, and D5 and updated available capacities are shown in FIG. 3.

Figure 3:
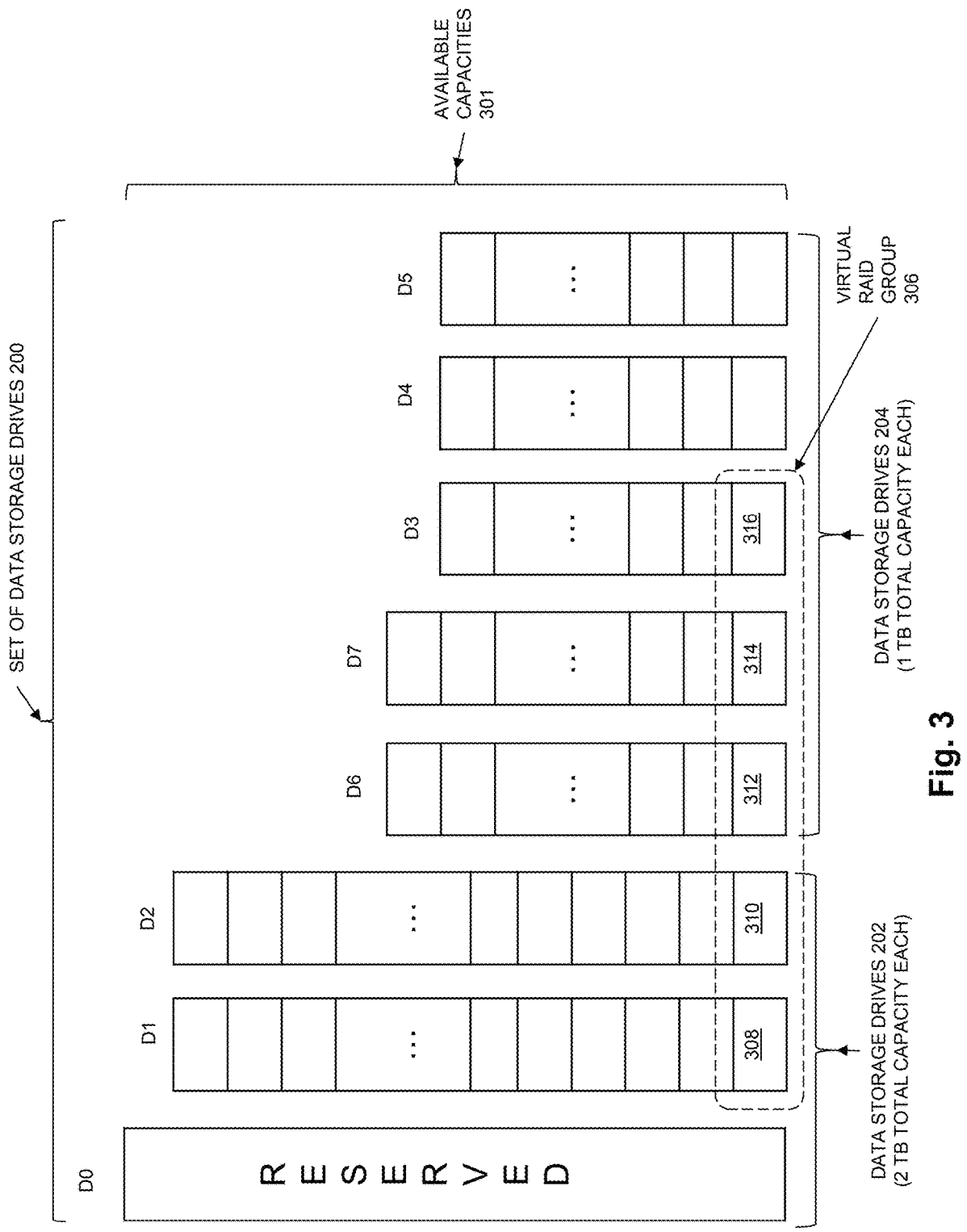
FIG. 3 is a block diagram showing the set of non-volatile data storage drives, and further illustrating operation of the disclosed technology while allocating a second virtual RAID group.

As further shown in FIG. 3, Storage Slice Allocation Logic 134 again starts with the second data storage drive in the ordered set of data storage drives (e.g. data storage drive D1) and allocates an individual storage slice from each subsequent data storage drive in the ordered set of data storage drives until 5 storage slices have been allocated to Virtual RAID Group 306. Specifically, Storage Slice Allocation Logic 134 allocates storage slice 308 from data storage drive D1, storage slice 310 from data storage drive D2, storage slice 312 from data storage drive D6, storage slice 314 from data storage drive D7, and storage slice 316 from data storage drive D3.

After Virtual RAID Group 306 is allocated, Available Capacity Update Logic 136 updates the available capacities of the data storage drives in Set of Data Storage Drives 200 to reflect the unavailability of storage slices 308, 310, 312, 314, and 316 that were allocated to Virtual RAID Group 306. For example, Available Capacity Update Logic 136 subtracts the size of one storage slice (e.g. four gigabytes) from the available capacity of data storage drives D1, D2, D6, D7, and D3, from which those storage slices were allocated to Virtual RAID Group 306. In this way, an updated available capacity is generated for each one of the data storage drives D1, D2, D6, D7, and D3. Storage Drive Ordering Logic 132 then re-orders Set of Data Storage Drives 200, again in descending order of available capacity, based on the updated available capacities. The process of virtual RAID group allocation, available capacity updating, and storage drive re-ordering repeats until the capacities of the data storage drives in Set of Data Storage Drives 200 other than D0 have been fully allocated and no further virtual RAID groups can be allocated.

Figure 4:
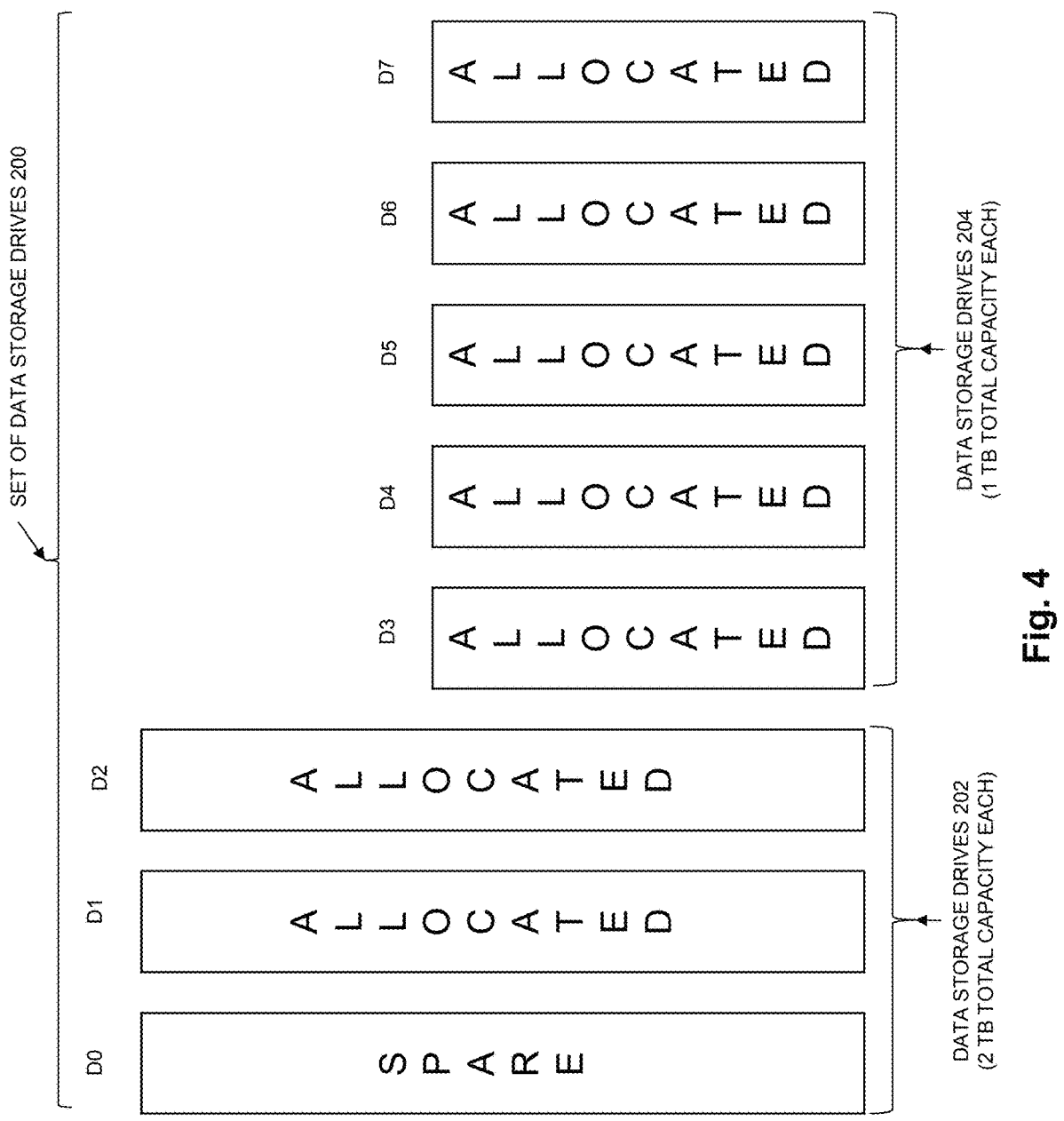
FIG. 4 is a block diagram showing the set of non-volatile data storage drives, after the capacities of all the non-volatile data storage drives have been fully allocated except for the reserved initial non-volatile data storage drive.
Figure 5:
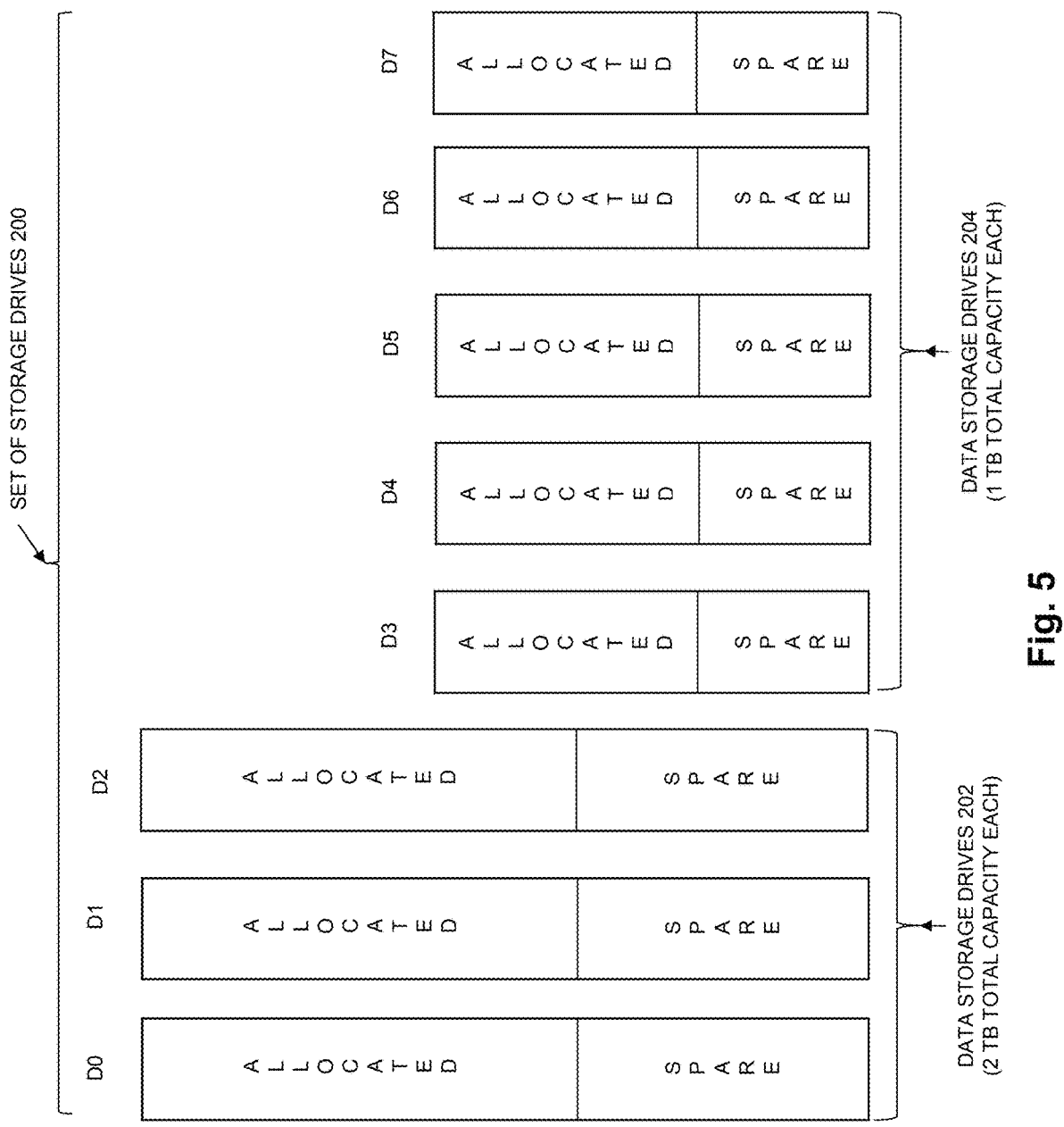
FIG. 5 is a block diagram showing the set of non-volatile data storage drives after spare data storage capacity has been proportionally distributed across all the non-volatile data storage drives in the set of non-volatile data storage drives.

FIG. 4 shows the Set of Non-Volatile Data Storage Drives 200 after the total capacities of all non-volatile data storage drives have been fully allocated except for the reserved spare capacity of data storage drive D0. The storage slices in data storage drive D0 are all available, and the storage slices in storage drives D3, D4, D5, D6 and D7 have all been allocated to virtual RAID groups. Virtual RAID Group Allocation Logic 130 swaps allocated storage slices located on data storage drives D3, D4, D5, D6 and D7 with available storage slices on data storage drive D0 until the spare storage capacity is distributed proportionally across all the data storage drives in Set of Data Storage Drives 200, based on the total capacity of each individual storage drive. As shown in FIG. 5, the swapping of allocated and spare storage slices causes each one of the storage drives in Set of Data Storage Drives 200 to contain the same percentage of its total capacity as spare storage capacity.

FIG. 6 is a flow chart showing an example of steps that may be performed during operation of some embodiments of the disclosed technology.

At step 600, a set of data storage drives is ordered in descending order of available capacity.

At step 602, virtual RAID groups are allocated based on the ordered set of data storage drives by, for each virtual RAID group that is allocated: i) beginning with a second data storage drive in the ordered set of data storage drives, allocate an individual storage slice from each subsequent data storage drive in the ordered set of data storage drives until a total number of storage slices that is required by each virtual RAID group have been allocated to the virtual RAID group, ii) update the available capacities of the data storage drives to reflect the unavailability of storage slices that were allocated to the virtual RAID group, and iii) re-order the set of data storage drives in descending order of available capacity based on the updated available capacities of the data storage drives.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

ordering a set of data storage drives in descending order of available capacity;

allocating virtual RAID groups based on the ordered set of data storage drives by, for each virtual RAID group:

beginning with a second data storage drive in the ordered set of data storage drives, allocating an individual storage slice from each subsequent data storage drive in the ordered set of data storage drives until a total number of storage slices that is required by each virtual RAID group have been allocated to the virtual RAID group;

updating the available capacities of the data storage drives to reflect the unavailability of storage slices that were allocated to the virtual RAID group; and re-ordering the set of data storage drives in descending order of available capacity based on the updated available capacities of the data storage drives.

2. The method of claim 1, further comprising:

reserving a first data storage drive in the ordered set of data storage drives such that storage slices are not allocated from the first data storage drive; and when no further virtual RAID groups can be allocated, swapping allocated storage slices located in data storage drives other than the first data storage drive with available storage slices located in the first data storage drive to proportionally distribute spare storage capacity across all the data storage drives.

3. The method of claim 1, further comprising:

when allocating a virtual RAID group, selecting a storage drive from which a last storage slice is to be allocated to the virtual RAID group from within multiple storage drives having the same available capacity by selecting a storage drive from which the fewest number of storage slices have previously been allocated to virtual RAID groups that also contain storage slices located on storage drives from which storage slices have previously been allocated to the virtual RAID group.

4. The method of claim 1, further comprising allocating RAID stripes from individual ones of the allocated virtual RAID groups.

5. The method of claim 4, wherein the total number of storage slices required by each virtual RAID group is equal to a RAID width of the RAID stripes allocated from the individual ones of the allocated virtual RAID groups.

6. A data storage system comprising:

processing circuitry and memory coupled to the processing circuitry, the memory storing instructions, wherein the instructions, when executed by the processing circuitry, cause the processing circuitry to:

order a set of data storage drives in descending order of available capacity;

allocate virtual RAID groups based on the ordered set of data storage drives by, for each virtual RAID group:

beginning with a second data storage drive in the ordered set of data storage drives, allocating an individual storage slice from each subsequent data storage drive in the ordered set of data storage drives until a total number of storage slices that is required by each virtual RAID group have been allocated to the virtual RAID group;

updating the available capacities of the data storage drives to reflect the unavailability of storage slices that were allocated to the virtual RAID group; and re-ordering the set of data storage drives in descending order of available capacity based on the updated available capacities of the data storage drives.

7. The data storage system of claim 6, wherein the instructions, when executed by the processing circuitry, further cause the processing circuitry to:

reserve a first data storage drive in the ordered set of data storage drives such that storage slices are not allocated from the first data storage drive; and when no further virtual RAID groups can be allocated, swap allocated storage slices located in data storage drives other than the first data storage drive with available storage slices located in the first data storage drive to proportionally distribute spare storage capacity across all the data storage drives.

8. The data storage system of claim 6, wherein the instructions, when executed by the processing circuitry, further cause the processing circuitry to:

when allocating a virtual RAID group, select a storage drive from which a last storage slice is to be allocated to the virtual RAID group from within multiple storage drives having the same available capacity by selecting a storage drive from which the fewest number of storage slices have previously been allocated to virtual RAID groups that also contain storage slices located on storage drives from which storage slices have previously been allocated to the virtual RAID group.

9. The data storage system of claim 6, wherein the instructions, when executed by the processing circuitry, further cause the processing circuitry to allocate RAID stripes from individual ones of the allocated virtual RAID groups.

10. The data storage system of claim 9, wherein the total number of storage slices required by each virtual RAID group is equal to a RAID width of the RAID stripes allocated from the individual ones of the allocated virtual RAID groups.

11. A computer program product including a non-transitory computer readable medium having instructions stored thereon, wherein the instructions, when executed on processing circuitry, cause the processing circuitry to perform steps including:

ordering a set of data storage drives in descending order of available capacity;

allocating virtual RAID groups based on the ordered set of data storage drives by, for each virtual RAID group:

beginning with a second data storage drive in the ordered set of data storage drives, allocating an individual storage slice from each subsequent data storage drive in the ordered set of data storage drives until a total number of storage slices that is required by each virtual RAID group have been allocated to the virtual RAID group;

updating the available capacities of the data storage drives to reflect the unavailability of storage slices that were allocated to the virtual RAID group; and re-ordering the set of data storage drives in descending order of available capacity based on the updated available capacities of the data storage drives.

12. The computer program product of claim 11, wherein the steps performed by the processing circuitry further include:

reserving a first data storage drive in the ordered set of data storage drives such that storage slices are not allocated from the first data storage drive; and when no further virtual RAID groups can be allocated, swapping allocated storage slices located in data storage drives other than the first data storage drive with available storage slices located in the first data storage drive to proportionally distribute spare storage capacity across all the data storage drives.

13. The computer program product of claim 11, wherein the steps performed by the processing circuitry further include:

when allocating a virtual RAID group, selecting a storage drive from which a last storage slice is to be allocated to the virtual RAID group from within multiple storage drives having the same available capacity by selecting a storage drive from which the fewest number of storage slices have previously been allocated to virtual RAID groups that also contain storage slices located on storage drives from which storage slices have previously been allocated to the virtual RAID group.

14. The computer program product of claim 11, wherein the steps performed by the processing circuitry further include allocating RAID stripes from individual ones of the allocated virtual RAID groups.

15. The computer program product of claim 14, wherein the total number of storage slices required by each virtual RAID group is equal to a RAID width of the RAID stripes allocated from the individual ones of the allocated virtual RAID groups.

* * * * *